United States Patent
Narula et al.

(10) Patent No.: US 11,637,678 B2
(45) Date of Patent: Apr. 25, 2023

(54) DETERMINATION OF GEOGRAPHIC RANGES IN SIDELINK COMMUNICATIONS INTRODUCTION

(71) Applicant: QUALCOMM Incorporated, San Diego, CA (US)

(72) Inventors: Mohit Narula, San Diego, CA (US); Richard Reid Hovey, Branchburg, NJ (US); Shailesh Patil, San Diego, CA (US); Deviprasad Putchala, San Diego, CA (US); Dan Vassilovski, Del Mar, CA (US); Hong Cheng, Basking Ridge, NJ (US); Michael Mitrani, San Diego, CA (US); Arthur Gubeskys, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 17/082,721

(22) Filed: Oct. 28, 2020

(65) Prior Publication Data

US 2022/0131674 A1    Apr. 28, 2022

(51) Int. Cl.
*H04L 5/00* (2006.01)
*H04L 1/1607* (2023.01)
(Continued)

(52) U.S. Cl.
CPC .......... *H04L 5/0055* (2013.01); *H04L 1/1607* (2013.01); *H04L 1/1861* (2013.01); *H04W 4/025* (2013.01); *H04W 72/54* (2023.01)

(58) Field of Classification Search
CPC ... H04L 5/0055; H04L 1/1607; H04L 1/1861; H04W 4/025; H04W 72/08
See application file for complete search history.

(56) References Cited

U.S. PATENT DOCUMENTS

2013/0344888 A1* 12/2013 Dousse ................. H04W 4/025
                                                                  455/456.1
2017/0322253 A1* 11/2017 Akers ................. G01R 31/2874
(Continued)

FOREIGN PATENT DOCUMENTS

WO    WO-2018030229 A1 *  2/2018

OTHER PUBLICATIONS

3GPP TS 36.331: "3rd Generation Partnership Project; Technical Specification Group Radio Access Network; Evolved Universal Terrestrial Radio Access (E-UTRA); Radio Resource Control (RRC); Protocol specification (Release 15)", V15.8.0, Dec. 2019, 4 Pages.

*Primary Examiner* — Sharmin Chowdhury
(74) *Attorney, Agent, or Firm* — Muncy, Geissler, Olds & Lowe, P.C./Qualcomm

(57) ABSTRACT

Certain aspects of the present disclosure provide methods and apparatus for determining a Zone identifier (ID), Zone Center, and negative acknowledgement (NACK) ranges. Included are operations and means at a receiving user equipment (UE) to determine a current geographic location (GLL) of the receiving UE, and select a Zone ID based on a two-dimensional (2-D) lookup into an indexed array with the current GLL, the indexed array storing Zone data for one or more geographic Zones. The Zone data for each geographic Zone may be indexed according to geographic position, and include a Zone ID, Zone center, and one or more NACK ranges, each NACK range corresponding with a geographic Zone disposed about the geographic Zone corresponding to the Zone ID. Operations further include performing a NACK operation based on the selected Zone ID and a NACK range.

30 Claims, 10 Drawing Sheets

(51) Int. Cl.
    *H04W 4/02*     (2018.01)
    *H04L 1/1829*   (2023.01)
    *H04W 72/54*    (2023.01)

(56) References Cited

U.S. PATENT DOCUMENTS

2017/0331686 A1\* 11/2017 Tsai .................. H04W 4/40
2019/0335348 A1\* 10/2019 Hou .................. H04W 4/46
2021/0029692 A1\*  1/2021 Hui .................. H04L 1/1825
2021/0192952 A1\*  6/2021 Silas ................. H04W 4/021
2021/0242975 A1\*  8/2021 Kim .................. H04L 1/1861

\* cited by examiner

DETERMINATION OF GEOGRAPHIC RANGES IN SIDELINK COMMUNICATIONS

INTRODUCTION

Aspects of the present disclosure relate to wireless communications and in some aspects to techniques for feedback signaling.

Wireless communication systems are widely deployed and provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

Such multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL).

Demands related to mobile broadband access continue to increase, evidenced by deployments of time sensitive radio communications. For example, in Vehicle-to-Everything (V2X) systems, geographic Zone calculations often involve accurate floating point computations, including conversions of Geographic Latitude and Longitude (GLL) to Zone identifiers (Zone ID). Using conventional methods, these calculations can be computationally expensive and time consuming, as well as frequent, in a dynamic vehicular environment. There are therefore needs for methods and means for enhancing calculations related to geographic Zone management.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved feedback signaling.

Certain aspects provide a method of determining a Zone ID, Zone Center, and negative-acknowledgement (NACK) ranges, including at a receiving user equipment (UE), determining a current GLL of the receiving UE, selecting a Zone identifier (ID) based on a 2-D lookup into an indexed array using the current GLL, where the indexed array is configured to store Zone data for one or more geographic Zones, the Zone data for each geographic Zone indexed according to geographic position, and including a pre-calculated ID, a pre-calculated Zone center, and one or more pre-calculated NACK ranges, each pre-calculated NACK range corresponding with a geographic Zone peripherally disposed about the geographic Zone corresponding to the pre-calculated Zone ID, and finally performing a NACK operation based on the selected Zone ID and one of the one or more pre-calculated NACK ranges.

The method may further include receiving, at the receiving UE, a location indication of a transmitting UE, and the NACK operation performed with the transmitting UE. As well, the indexed array may be stored in a persistent storage at the receiving UE. The method may further include retrieving, at the receiving UE, the indexed array from a remote source, where the retrieved indexed array includes a Zone cluster, and the size of the Zone cluster is controlled in accordance with storage resources at the receiving UE.

The indexed array may be configured with pre-calculated Zone data associated with recurring routes traversed by a vehicle bearing the receiving UE. The indexed array may be a static indexed array, or a dynamic indexed array, which may include a global crowdsourced dynamic indexed array comprising Zone data provided by other UEs. The dynamic indexed array may also include locally adapted fields added to the Zone data.

Certain aspects provide an apparatus for determining a Zone ID, Zone Center, and NACK ranges, including a processor configured to determine a current geographic location (GLL), select a Zone ID based on a 2-D lookup into an indexed array using the current GLL, where the indexed array may be configured to store Zone data for one or more geographic Zones, the Zone data for each geographic Zone indexed according to geographic position, and including a pre-calculated Zone ID, a pre-calculated Zone center, and one or more pre-calculated NACK ranges, each pre-calculated NACK range corresponding with a geographic Zone peripherally disposed about the geographic Zone corresponding to the pre-calculated Zone ID, and perform a NACK operation based on the selected Zone ID and one of the one or more pre-calculated NACK ranges. The apparatus may further include a transceiver for receiving a location indication of a transmitting UE, and performing the NACK operation with the transmitting UE. The transceiver may be further configured to retrieve the indexed array from a remote source.

Aspects also provide that the apparatus may further include a persistent storage in which the indexed array is stored. The retrieved indexed array may include a Zone cluster, with the size of the Zone cluster controlled in accordance with storage resources. The indexed array may be populated with pre-calculated Zone data associated with recurring routes traversed by a vehicle bearing the apparatus. According to an aspect, the indexed array is a static indexed array, and according to another aspect, the indexed array is a dynamic indexed array. The dynamic indexed array may include a global crowd-sourced dynamic indexed array comprising Zone data provided by other UEs, and locally adapted fields added to the Zone data.

Certain aspects provide an apparatus for determining a Zone ID, Zone Center, and NACK ranges, the apparatus including, at a receiving UE, means for determining a current GLL of the receiving UE, means for selecting a Zone ID based on a 2-D lookup into an indexed array using the current GLL, the indexed array configured to store Zone data for one or more geographic Zones, the Zone data for each geographic Zone indexed according to geographic position, and including a pre-calculated Zone identifier (ID), a pre-calculated Zone center, and one or more pre-calculated NACK ranges, each pre-calculated NACK range corresponding with a geographic Zone peripherally disposed about the geographic Zone corresponding to the pre-calculated Zone ID, and means for performing a NACK operation based on the selected Zone ID and one of the one or more pre-calculated NACK ranges.

The apparatus may further include means for receiving, at the receiving UE, a location indication of a transmitting UE, and the NACK operation performed with the transmitting UE. The indexed array is stored in a persistent storage at the receiving UE. The apparatus may also include means for retrieving, at the receiving UE, the indexed array from a remote source, where the retrieved indexed array may include a Zone cluster, the size of the Zone cluster controlled in accordance with storage resources at the receiving UE. Aspects provide that the indexed array may be configured with pre-calculated Zone data associated with recurring routes traversed by a vehicle bearing the receiving UE. Further, the indexed array may be a dynamic indexed array, including a global crowdsourced dynamic indexed array comprising Zone data provided by other UEs.

Certain aspects also provide a non-transitory computer readable storage medium storing code, which when executed by a computer, causes the computer to perform operations for determining a Zone ID, Zone Center, and NACK range. In an aspect, the non-transitory computer readable storage medium, includes code for determining, for a receiving user equipment (UE) in a vehicle, a current GLL of the receiving UE, code for selecting a Zone ID based on a 2-D lookup into an indexed array using the current GLL, the indexed array configured to store Zone data for one or more geographic Zones, the Zone data for each geographic Zone indexed according to geographic position, and including a pre-calculated Zone identifier (ID), a pre-calculated Zone center, and one or more pre-calculated NACK ranges, each pre-calculated NACK range corresponding with a geographic Zone peripherally disposed about the geographic Zone corresponding to the pre-calculated Zone ID, code for receiving, at the receiving UE, a location indication of a transmitting UE, and code for performing a NACK operation with the transmitting UE based on the selected Zone ID and one of the one or more pre-calculated NACK ranges associated with the location indication of the transmitting UE.

The non-transitory computer readable storage medium of claim 27 may further include code for retrieving, at the receiving UE, the indexed array from a remote source, and the indexed array configured with pre-calculated Zone data associated with recurring routes traversed by a vehicle bearing the receiving UE. Aspects provide that the indexed array may be a dynamic indexed array, including a global crowdsourced dynamic indexed array comprising Zone data provided by other UEs.

To the accomplishment of the foregoing and related ends, the one or more aspects include the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

To understand in detail the various features of the present disclosure recited above, more particular descriptions are illustrated in the drawings. The appended drawings illustrate certain typical aspects of this disclosure and are therefore not to be considered as limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
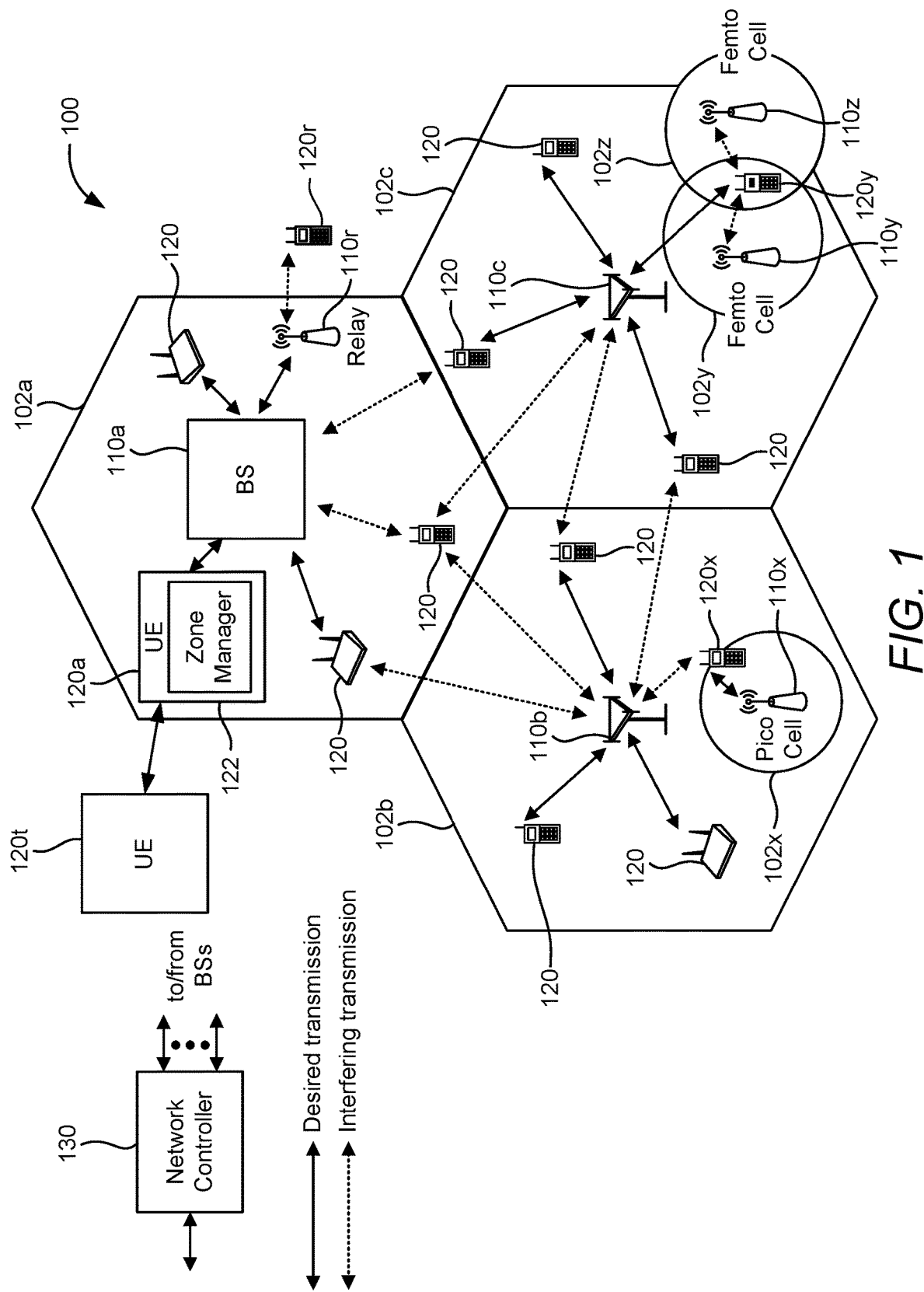
FIG. 1 is a block diagram conceptually illustrating an example telecommunications system, in accordance with aspects of the present disclosure.

Aspects of the present disclosure provide apparatus, methods, processing systems, and computer readable mediums for enhanced calculation of Zone IDs, Zone centers, and NACK ranges, for distance-based hybrid automatic repeat request (HARQ) feedback transmission. For sidelink communication, an acknowledgement feedback from a data receiver user-equipment (UE) (also referred to herein as an "Rx UE") to a data transmitter UE (also referred to herein as a "Tx UE") may be sent if the distance between the UEs is less than a threshold distance (i.e., "NACK range"). Thus, the Rx UE may be required to determine the distance between the Rx UE and the Tx UE for a HARQ transmission. According to aspects of the present disclosure, the distance between the UEs may be determined using geographical Zones to reduce signaling overhead. That is, instead of the Tx UE transmitting an exact GLL of the Tx UE to the Rx UE for the Rx UE to determine the distance, the Tx UE may transmit an identifier of geographical Zone in which the Tx UE is located. The Rx UE may then determine the geographical Zone of its own current location, determine which surrounding Zones are within NACK range, and determine whether the Tx UE is within NACK range.

The following description references the use of distance-based HARQ feedback in communication systems and determination of geographical Zones within NACK range, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. That is, an apparatus may be implemented or a method may be practiced using any number of the aspects set forth herein. In addition, the scope of the disclosure is intended to comprehend such an apparatus or method which is practiced using other structures, functionalities, or structures and functionalities, in addition to, or other than, the various aspects of the disclosure set forth herein. It will be appreciated that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a sub-band, etc. Each frequency may support a single RAT in a given geographic area in order to avoid interference between wireless networks of different RATs. In some cases, a 5G NR RAT network may be deployed.

FIG. 1 illustrates an example wireless communication network 100 in the context of which various aspects of the present disclosure may be performed. For example, the wireless communication network 100 may be an NR system (e.g., a 5G NR network).

As illustrated in FIG. 1, the wireless communication network 100 may include one or more base stations (BSs) 110a-z (each also individually referred to herein as BS 110 or collectively as BSs 110) and other network entities. A BS 110 may provide communication coverage for a geographic area, often referred to as a "cell," which may be stationary or may move in accordance with the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b, and 110c, may be macro BSs for the macro cells 102a, 102b, and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

The BSs 110 and UEs 120 may be configured for distance-based HARQ signaling. As shown in FIG. 1, a UE 120a includes a Zone Manager 122. The Zone Manager 122 may be configured to determine a Zone in which the UE 120a may be occupying at the time of performance, which may contribute to an estimation of a distance between the UE 120a and UE 120t. (Herein, in view of the dynamic vehicular applications of the UEs discussed, "time of performance" may be regarded as the time at which the disclosed Zone management operations are performed.) Based on the estimated distance, the UE 120a may further transmit HARQ feedback, including a NACK message, to UE 120t.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for the BSs 110. The network controller 130 may communicate with the BSs 110 via a backhaul. The BSs 110 may also communicate with one another (e.g., directly or indirectly) via wireless or wireline backhaul.

Figure 2:
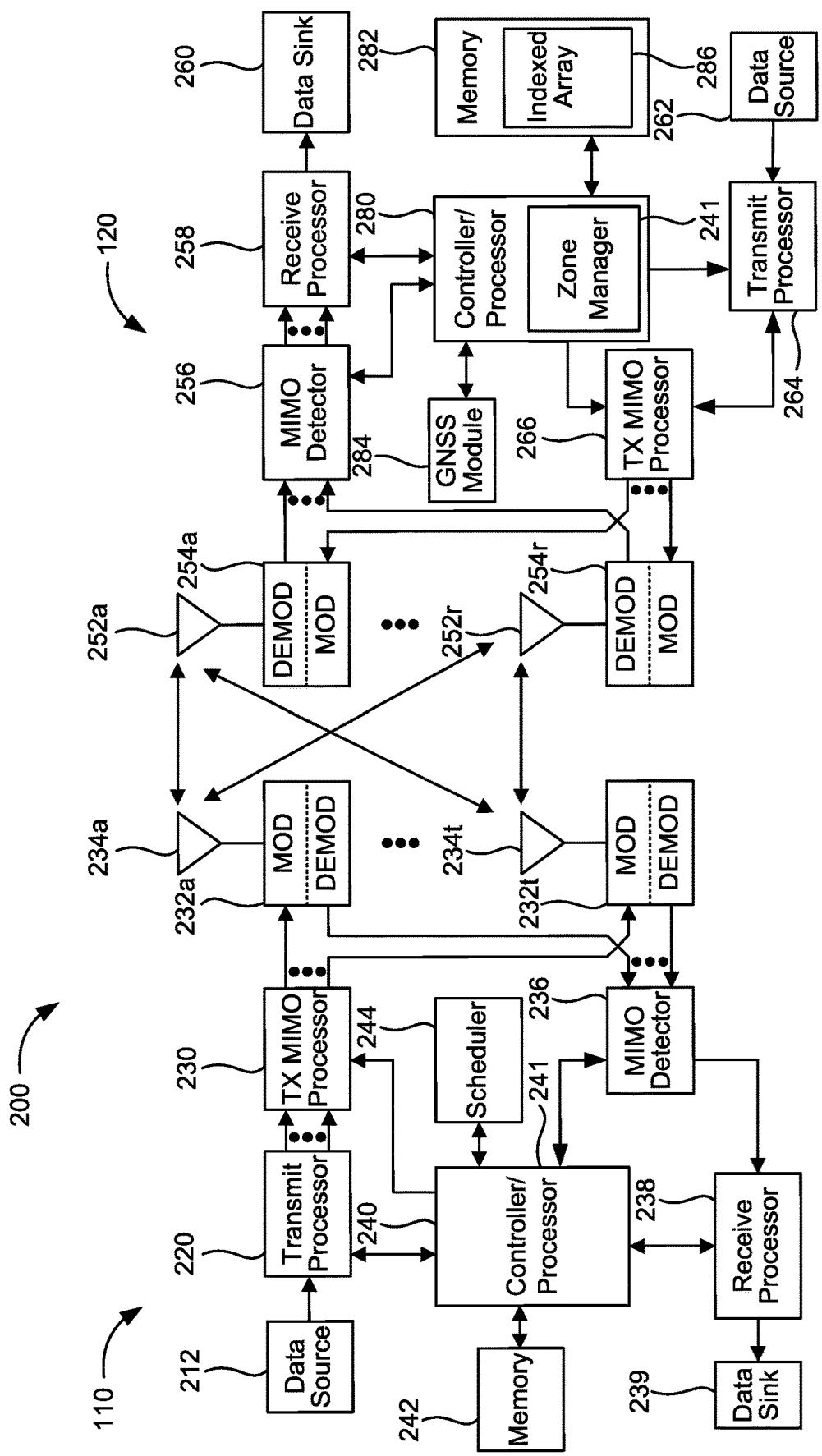
FIG. 2 is a block diagram conceptually illustrating a design of an example a base station (BS) and user equipment (UE), in accordance with aspects of the present disclosure.

FIG. 2 is a block diagram 200 illustrating example components of BS 110a and UE 120a (e.g., in the wireless communication network 100 of FIG. 1), which may be used to implement aspects of the present disclosure.

At the BS 110, a transmit processor 220 may receive data from a data source 212 and control information from a Controller/Processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from MODs 232a-232t may be transmitted via the antennas 234a-234t, respectively.

At the UE 120, the antennas 252a-252r may receive the downlink signals from the BS 110a and may provide received signals to the demodulators (DEMODs) in transceivers 254a-254r, respectively. Each DEMOD in transceiver 254 may condition (e.g., filter, amplify, downconvert, and digitize) a respective received signal to obtain input samples. Each DEMOD in transceiver 254 may further process the input samples (e.g., for OFDM, etc.) to obtain received symbols. A MIMO detector 256 may obtain received symbols from all the DEMODs in transceivers 254a-254r, perform MIMO detection on the received symbols if applicable, and provide detected symbols. A receive processor 258 may process (e.g., demodulate, de-interleave, and decode) the detected symbols, provide decoded data for the UE 120a to a data sink 260, and provide decoded control information to a Controller/Processor 280.

A transmit chain at the UE 120 may facilitate uplink, and other, transmissions. For an uplink, at UE 120, a transmit processor 264 may receive and process data (e.g., for the physical uplink shared channel (PUSCH)) from a data source 262 and control information (e.g., for the physical uplink control channel (PUCCH) from the Controller/Processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the DEMODs in transceivers 254a-254r (e.g., for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the Controller/Processor 240. Sidelink communications (e.g., PC5 direct channel communications between UEs) and HARQ feedback transmissions, including NACK messaging, may also be facilitated with the transmit chain described in the foregoing.

Memories 242, 282, may store data and program codes for BS 110 and UE 120, respectively. Memory 282 may include storage for Indexed Array 286. A scheduler 244 may schedule UEs for data transmission on the downlink and/or uplink. GNSS Module 284 may be controlled by the Controller/Processor 280, for use in determining a GLL of the UE 120, which may be stored in Memory 282 or Indexed Array 286.

Controller/Processor 280 and/or other processors and modules at the UE 120 may perform or direct the execution of processes for the techniques described herein. As shown in FIG. 2, the Controller/Processor 280 of the UE 120 includes a Zone Manager 241 configurable to determine various descriptors regarding a Zone in which the UE 120 may be located. Such "Zone data" may include a Zone ID (or, "ID," herein), an associated Zone center, and Zone IDs of surrounding Zones that are within NACK range of the UE 120, according to aspects described herein. Although certain operations are shown as being performed at the Controller/Processor 280, it will be appreciated that other components of the UE 120 and BS 110 may be used for performing various aspects of the operations described herein. Aspects provide for remote calculation of Zone data at the Controller/Processor 240 and storage thereof in Memory 242 of BS 110.

Figure 3B:
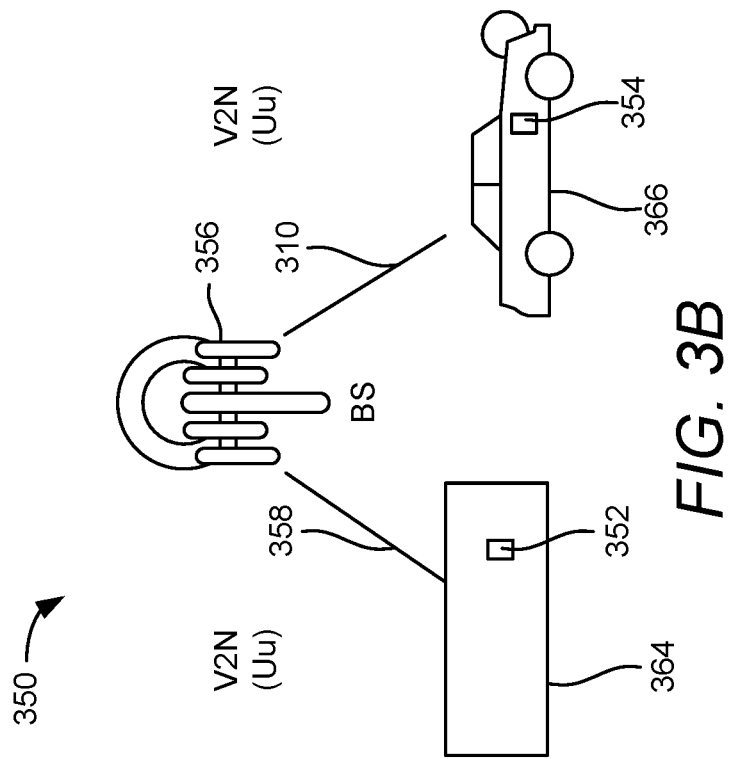
FIGS. 3A and 3B are diagrammatic representations of example vehicle to vehicle (V2V) and vehicle to everything (V2X) systems relating to aspects of the present disclosure.
Figure 3A:
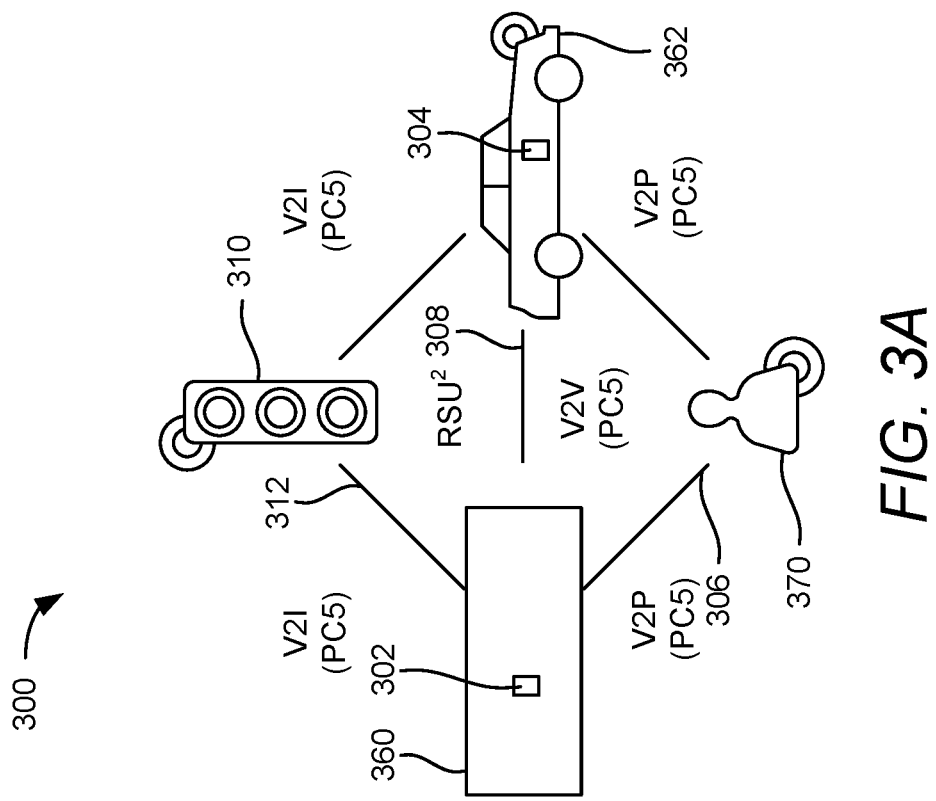

FIGS. 3A and 3B are diagrammatic representations of example vehicle to vehicle (V2V) and vehicle to everything (V2X; herein, "V2X" will be understood to comprehend also C-V2X, which allows the UE to use a cellular network connection) systems relating to aspects of the present disclosure. For example, the UEs 302, 304, 352, 354, shown in FIGS. 3A and 3B, may communicate via sidelink channels and perform sidelink channel state information (CSI) reporting.

V2X systems 300, 350, conceptualized in FIGS. 3A and 3B, provide complementary transmission modes. A first transmission mode, shown in FIG. 3A, involves direct communications (also referred to as "sidelink" communications) between proximal participants in a local area. A second transmission mode, shown in FIG. 3B, includes network communications, where a network may be implemented over a so-called Uu interface (for example, a wireless communication interface between a radio access network (RAN) and a UE).

Referring to FIG. 3A, example V2X/V2V system 300 (including vehicle-to-vehicle (V2V) communications) is illustrated with two UEs 302, 304 disposed with vehicles 360, 362, respectively. The first transmission mode allows for direct communication between different participants at a particular GLL. As illustrated, a vehicle 360 may have a wireless communication link with an individual 370 (V2P communications via a UE, for example) using a PC5 interface 306. Communications between the UEs 302, 304 may be performed also using a PC5 interface 308. In a like manner, communications may be performed between a UE 302 and various highway components, such as traffic signal 310 or a sign (referred to as V2I communications) through a PC5 interface 312. Each communication link illustrated in FIG. 3A may enable two-way communications between elements, thus each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3B shows a V2X/V2V system 350 for network communications between a UE 352 disposed in vehicle 364 and a UE 354 disposed in vehicle 366 through a network entity 356, such as a base station (BS 110a-z, and/or, for example, an eNB or gNB), that sends and receives information to and from (for example, relays information between) UEs 352, 354. The network communications through vehicle to network (V2N) links 358 and 310 may be used, for example, for long range communications between vehicles, such as for communicating the presence of a car accident at some distance ahead along a road or highway. Other types of communications may be sent by the network entity 356 to vehicles (e.g., UEs 352, 354), such as traffic flow conditions, road hazard warnings, environmental/weather reports, and service station availability, among other examples. Such data can be obtained from cloud-based sharing services.

Under some circumstances, two or more subordinate entities (for example, UEs 352, 354) may communicate also, or instead, using sidelink signals. As described above, V2V and V2X communications are examples of communications that may be implemented via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, and mission-critical mesh communications, among other suitable applications. Generally, a sidelink may refer to a direct link between one subordinate entity, such as a first UE, and another subordinate entity, such as a second UE. As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink broadcast channel (PSBCH), a physical sidelink control channel (PSCCH), a physical sidelink shared channel (PSSCH), and a physical sidelink feedback channel (PSFCH). The PSCCH may carry control signaling such as sidelink resource configurations and other parameters used for data transmissions, and the PSSCH may carry the data transmissions. The PSFCH may carry feedback information, such as CSI messaging, and ACK or NACK bits, to a sidelink channel quality.

Aspects of the present disclosure involve sidelink communications, such as V2X/V2V communications as described with regard to FIGS. 3A and 3B. In V2X communications, a HARQ feedback (NACK) transmission may be based on distance. For example, a data receiver UE (also referred to herein as "Rx UE") may transmit hybrid automatic repeat request (HARQ) feedback to a data transmitter UE (also referred to herein as "Tx UE") contingent upon a physical distance between the Rx UE and the Tx UE being less than a certain distance threshold (i.e., NACK range). For such distance-based HARQ, a GLL of the Tx UE may be required at the Rx UE to enable the Rx UE to determine whether to transmit HARQ feedback. Accordingly, the Tx UE may indicate its location to the Rx UE. The Rx UE also determines its own location, and further, that the Tx UE is within NACK range.

Aspects of the present disclosure are directed, correspondingly, to determining a location of the Rx UE and a NACK range to a Tx UE. In particular, such a location may be characterized in terms of geographical Zones, using known methods. Geographical Zones are conventionally used for reducing the resource overhead for signaling a UE location. For instance, partitioning the surface of the Earth into Zones based on Global Navigation Satellite System (GNSS) positioning, results in each Zone having a configured size (e.g., 50×50 meters). For example, a Zone identifier (ID) associated with the location of a Tx UE, may be signaled from the Tx UE to an Rx UE for the purpose, as mentioned, of determining a distance between the two for distance-based HARQ feedback. Additionally, for each geographical Zone ID, a geographical Zone center may be specified. 3GPP Specification 36.331, § 5.10.13.2, for example, specifies methods for calculating a Zone ID of a geographical Zone for a UE, by use of a current GNSS latitude and longitude and configuration parameters provided in a System Information Block (SIB) Type 21. By transmitting Zone information, signaling overhead may be reduced advantageously in comparison with encoding the Tx UE's GLL as latitude and longitude coordinates. This may be important since the signaling overhead associated with indicating the absolute location/coordinates of the Tx UE may not be acceptable at lower layers, for example. However, continually calculating a Zone ID for a moving platform may yet consume a disadvantageous amount of computational resources. For example, a vehicle moving at 65 MPH (29 m/s) may traverse Zones sized at 50×50 m at a rate of approximately 34 Zones per minute, or one Zone about every 2 seconds. Accordingly, methods disclosed herein provide for enhanced calculation of Zone ID and Zone centers for use in consequent NACK range calculations.

Figure 4:
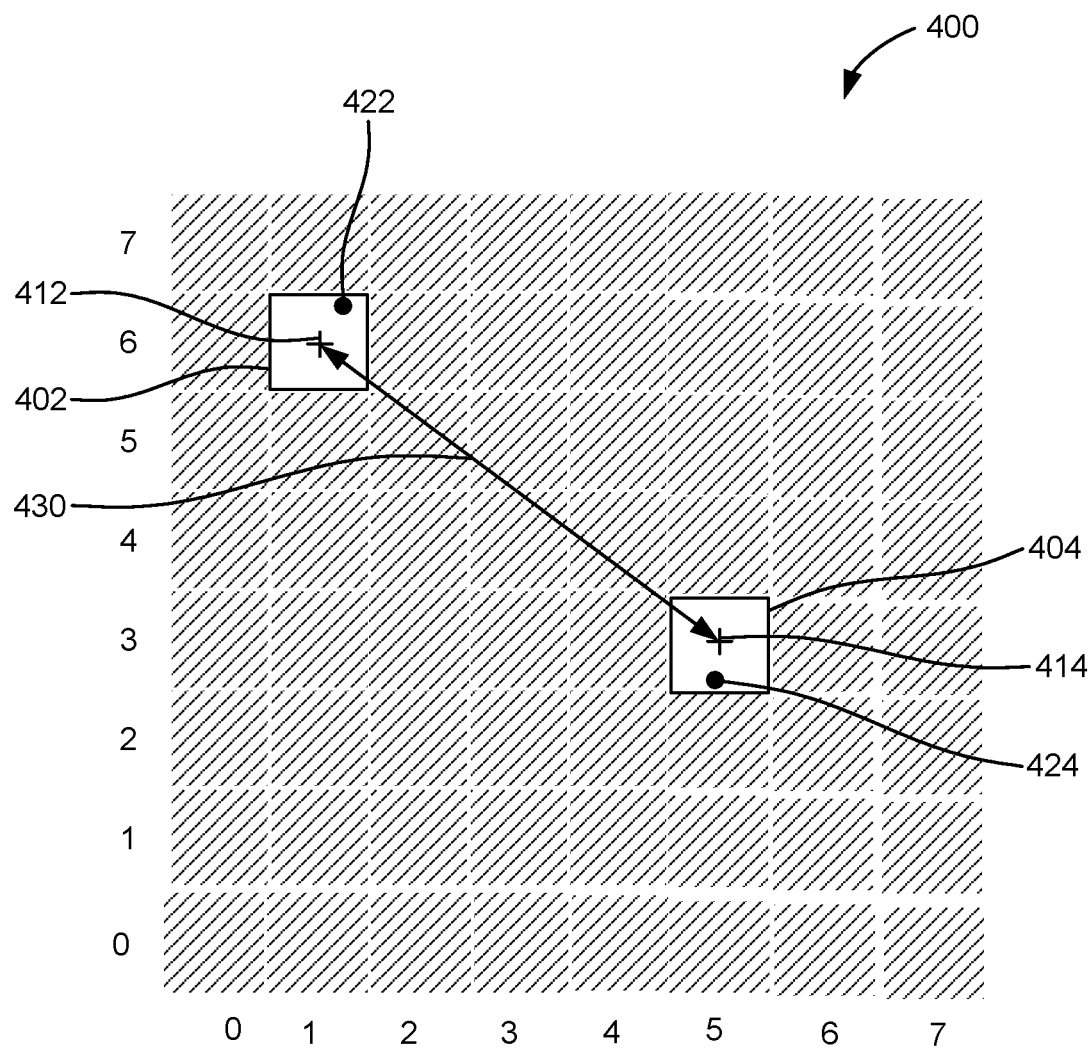
FIG. 4 illustrates an example grid of Zones including a Zone in which a receiver UE and transmitter UE may be located.

For the purposes of clarification and visualization, FIG. 4 depicts an example grid of geographical Zones 400 ("Zones"). An Rx UE and a Tx UE are situated respectively in Zone 402 and Zone 404. Each Zone in the grid of Zones 400 has an associated Zone ID and Zone center. In an example operation, an Rx UE may monitor for, and receive, a transmission from a Tx UE including an indication of a location of the Tx UE, which may include a Zone ID associated with the location of the Tx UE. Rx UE location 422 and Zone center 412 are shown in Zone 402, and Tx UE location 424 and Zone center 414 in Zone 404. As mentioned, a distance 430 between the Rx UE location 422 and the Tx UE location 424 may be estimated based on some distance determined between Zone 402 and Zone 404. After receiving at the Rx UE a Zone ID and Zone center 414 associated with the Zone 404 related to the location of the Tx UE, the Rx UE may then calculate the distance 430 between the received Zone center 414 of Zone 404 and the Zone center 412 of Zone 402. While the Tx UE has signaled location information, it will be appreciated that the Rx UE determines its own location for a distance 430 to be determined. In particular, the Rx UE may need to know the Zone ID, and Zone center 412, for the Zone 402 in which it is situated at the time the distance to the Tx UE is determined.

In the disclosed aspects, when a GLL of an Rx UE determined, e.g., facilitated by a GNSS Module 284, an indexed array 500 may be accessed at the Rx UE using a latitude/longitude (lat/lon) pair, for example, to retrieve a current Zone ID (for the Zone currently occupied by the Rx UE) and Zone center, as well as one or more Zone IDs corresponding with Zones that are peripherally disposed about the current Zone (i.e., typically Zones that may be adjacent, or otherwise relatively nearby). NACK ranges associated with each of the peripherally disposed Zones may be additionally retrieved.

Accordingly, four approaches enabling the Rx UE to determine its location, and other locations within NACK range, are described in the present disclosure. It will be appreciated that various implementations and aspects of any one, or more, of the four approaches may apply to any, or all, of the other approaches. Each approach, as described, is therefore regarded as not being exclusive of any of the other described approaches in all aspects.

In a first approach, Zone IDs and respective geographic Zone centers, as well as other data discussed below, may be pre-calculated at the Rx UE and stored in a two-dimensional (2-D) indexed array. According to aspects, the 2-D indexed array, such as Indexed Array 286 in Memory 282, may be a static indexed array stored in persistent storage at the Rx UE. The indexed array may be populated with pre-calculated data comprising Zone IDs and Zone centers for some predetermined number and distribution of geographical Zones other than the Zone corresponding with a current location of the Rx UE. In various aspects, at a given GLL, a Zone ID and corresponding Zone center may be advantageously retrieved by performing a simple 2-D array indexed lookup into the indexed array based on latitude and longitude. For example, an Rx UE may determine its geographical location in terms of lat/lon, and use that lat/lon pair to perform a 2-D lookup into the indexed array, and thus find its current Zone ID and Zone center. It will be appreciated, of course, that the operation of a 2-D array indexed lookup is well-known. It may, for example, be referred to a as a lookup table (LUT) operation. According to aspects, the indexed array may be a static indexed array, which may be useful given the substantially static nature of the location data over time.

As mentioned, in addition to Zone ID and Zone center data, other fields may be added in the indexed array. In particular, these added data may indicate static, pre-calculated NACK ranges in relation to a given location. For example, an Rx UE may simply reference directly into the 2-D indexed array with current latitude and longitude values to retrieve data (e.g., Zone IDs) associated with some number of geographical Zones that are near, or adjacent, (i.e., peripherally disposed) to its own geographical Zone. According to an aspect, any Zone ID not so retrieved may be regarded as being out of range. This approach eliminates floating-point computations and vehicular Zone tracking otherwise required to identify a Zone ID and Zone center in which the Rx UE currently occupying or traversing, followed by subsequent calculations regarding nearby Zones. Instead, all that is required is for the Rx UE to first acquire current latitude and longitude values to be used as 2-D array indices.

Figure 5:
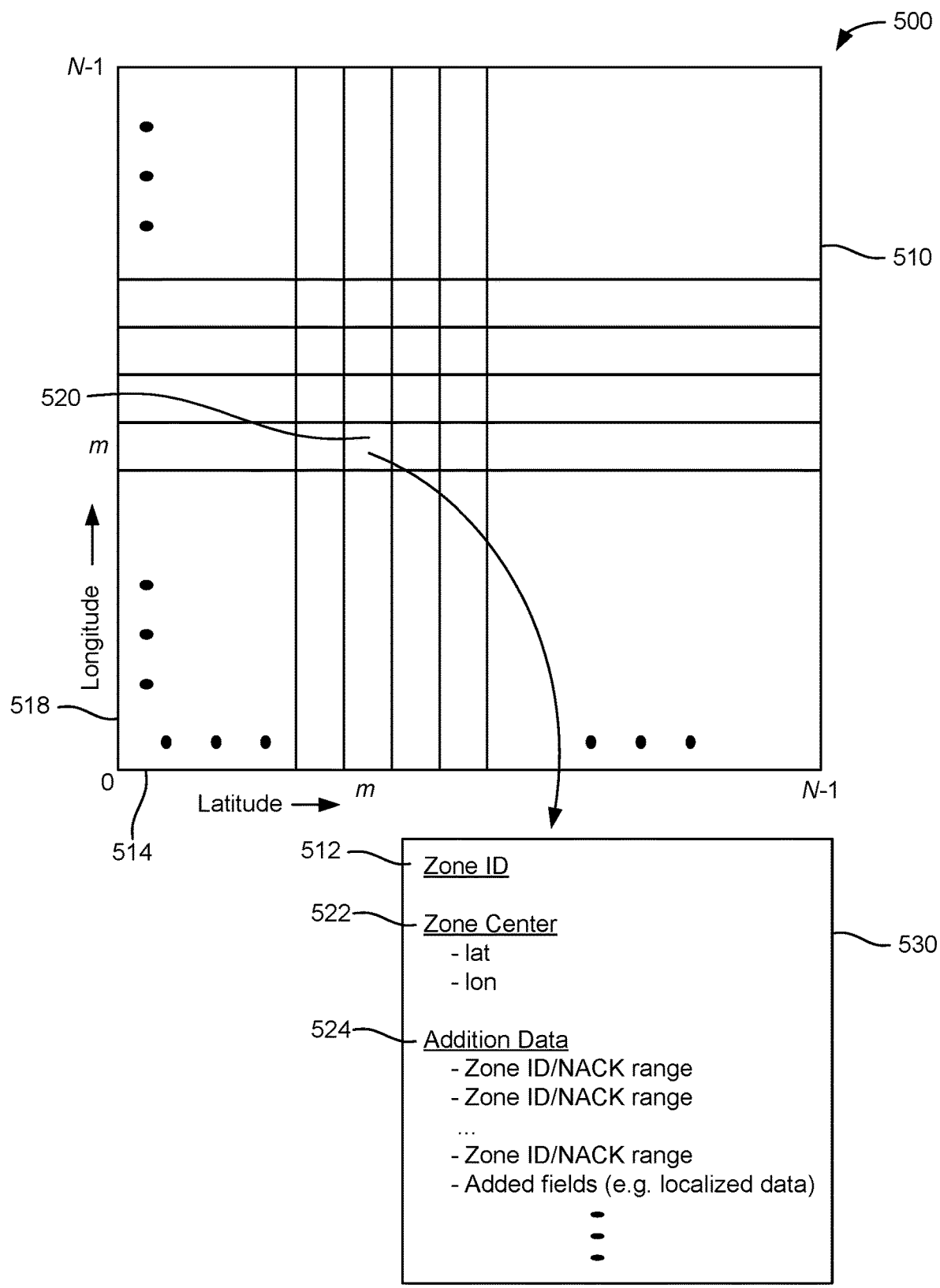
FIG. 5 is a conceptual diagram of an indexed array in accordance with aspects of the present disclosure.

FIG. 5 depicts a visualization of an example 2-D indexed array 500, as contemplated in accordance with aspects disclosed herein. A table 510 may include an array of entries, such as typical entry 520, indexed according to N latitude (lat) values 514 and N longitude (lon) values 518. That is, for example, data stored at entry 520 may be retrieved by indexing into the table 510 with latitude value lat (m), and longitude value lon (m). It will be appreciated that the granularity (i.e., resolution) of indexing for table 510 may vary, and be determined according to various conditions, including, but not limited to, any of computational resources, storage requirements, dynamic Rx UE behaviors (e.g., speed and/or directional stability of the platform/vehicle bearing the Rx UE), resolution of GLL data, etc. It will also be appreciated that other indexing schemes may be implemented, based on an expression for location other than lat/lon, as an example, possibly resulting in a table 510 that is not "square," such as the N×N arrangement depicted. According to aspects, such structures as linked lists may be implemented, for example, to track a particular route and the Zones associated with that route, or any other database structure. Other table and/or database structures may be used to similar effect, and will lie within the scope of the present disclosure.

Entry data 530 represents an exploded view of entry 520, showing various Zone data that may be stored. Entry data 530 may include Zone ID 512 and Zone center 522 that may correspond, for example, with Zone 402, and Zone center 412 of FIG. 4. The Zone ID 512 may be encoded in accordance with conventional schemes, such as that described with regard to 3GPP Specification, though it will be appreciated that other encodings may be used. Also, the Zone center 522 may be encoded as a latitude/longitude pair, for example, though other encodings for geographic position data may be used. Also depicted is Additional Data 524, which may include a list of Zone IDs for Zones that are adjacent, or substantially nearby as appropriate, (i.e., peripherally disposed) to the current Zone in which the Rx UE is located. Zone IDs so included in Additional Data 524 may indicate that the Zones associated with these Zone IDs are within NACK range relative to the current Zone. (Conversely, any Zones not so listed may therefore be regarded as out of NACK range.) Additional Data 524 may include fields explicitly marking the Zones associated with the Zone IDs as being within NACK range. It will be appreciated that other schemes for associating Zone IDs with NACK ranges within the NACK threshold, using the entries 520 of the table 510, may be contemplated, any of which would be within the scope of the present disclosure. Further, as will be discussed in more detail below, the Additional Data 524 may be configured to store other types of data for various purposes. As used herein, the term "Zone data" will be understood to represent at least the data depicted in entry data 530. That is, Zone data may include a Zone ID 512 (also referred to herein variously as "selected Zone ID"), Zone center 522, and Additional Data 524, including Zone IDs with corresponding NACK ranges.

Accordingly, a determination at the Rx UE of whether received location data from a Tx UE (e.g., a Zone ID indicating Tx UE location 424, in FIG. 4) describe a location within a current NACK range threshold of the Rx UE may be efficiently accomplished. Indexing into the table 510 with the current lat/lon of the Rx UE may enable selection of the corresponding entry 520, which may include the Zone ID 512 and corresponding Zone center 522 of the Rx UE, as indexed with the current lat/lon. Additional Data 524 may also be accessed and selected, the Additional Data 524 comprising one or more Zone IDs, each of which associating with geographical Zones that may be within the NACK range threshold of the current location of the Rx UE. Thus, a simple comparison of the received Tx UE Zone ID may quickly indicate whether the Tx UE is within NACK range.

Figure 6:
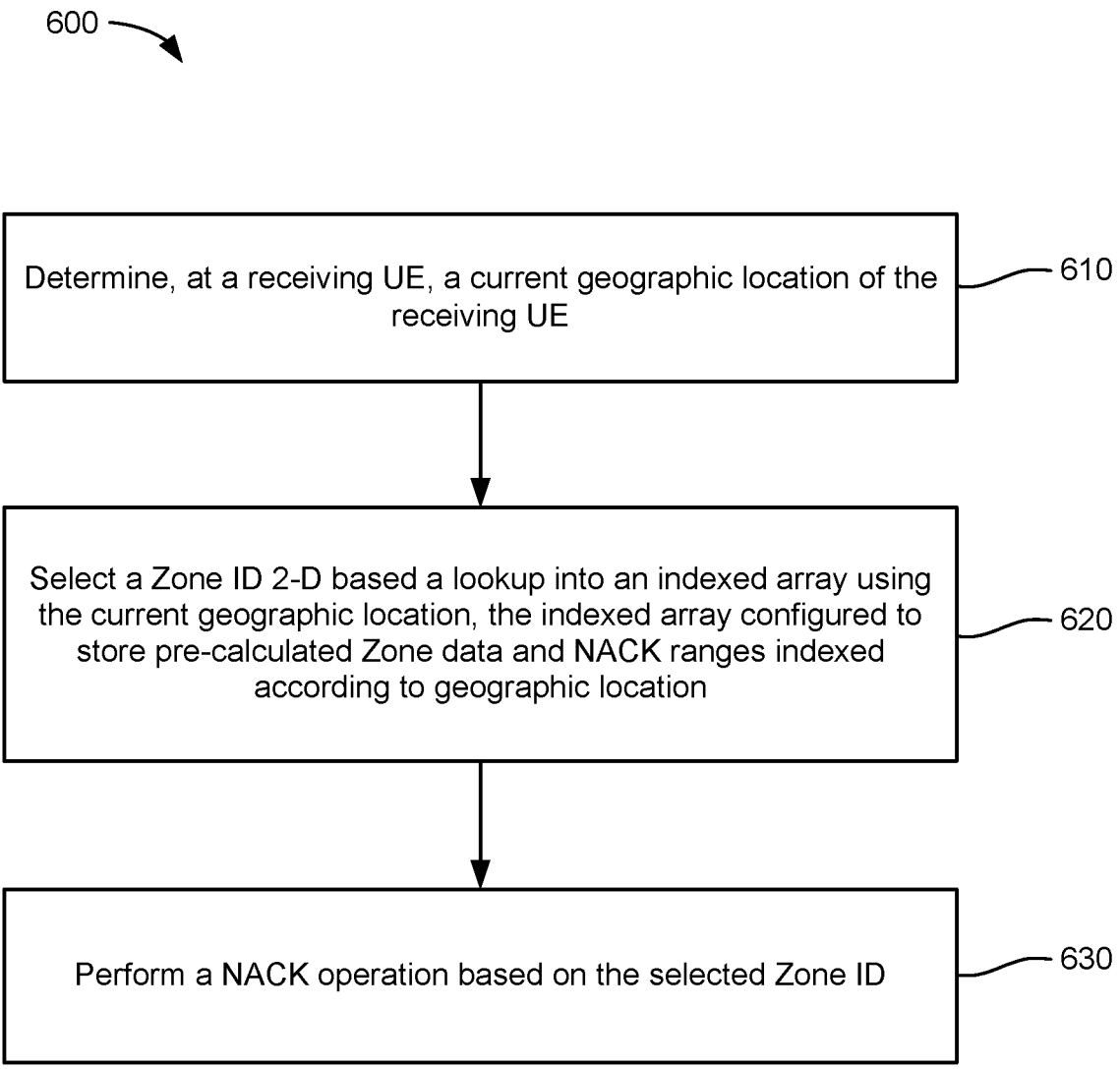
FIG. 6 is a flow diagram illustrating example operations for enhancing the calculation of Zone IDs, Zone centers, and NACK ranges, in accordance with aspects of the present disclosure.

FIG. 6 is a flow diagram illustrating example operations 600 for enhancing calculations of Zone IDs, Zone centers, and NACK ranges, in accordance with certain aspects of the present disclosure. The operations 600 may be performed, for example, at a UE (e.g., Rx UE, such as a UE 120a of the wireless communication network 100, depicted in FIG. 1).

Operations 600 may be implemented as software components that are executed and run on one or more processors, memories and data structures, and position/location modules (e.g., Controller/Processor 280, Memory 282, Indexed Array 286, and GNSS Module 284, of FIG. 2). In particular, operations 600 may be performed all, or in part, at a Zone Manager 241, an element of Controller/Processor 280. Further, any transmissions and/or receptions of signals by the UE in operations 600 may be enabled, for example, by one or more antennas (e.g., antennas 252, of FIG. 2). According with some aspects, transmission and/or reception of signals by the UE may be implemented via a bus interface of one or more processors (e.g., Controller/Processor 280) obtaining and/or outputting signals.

For example, a receiving UE (Rx UE) may determine 610 a current GLL of the Rx UE. According to aspects, determining 610 may include calculating the current GLL at the Rx UE using positioning facilities such as provided by GNSS Module 284 (see FIG. 2). According with some aspects, the calculated current GLL may be encoded as a latitude and longitude (lat/lon) pair, though it will be appreciated that other GLL encodings corresponding indexed array schemes may be equally efficacious. A Zone ID 512 may be selected 620 at the Rx UE, based on a lookup into a 2-D indexed array 500 using the current geographical location of the Rx UE. As discussed, the indexed array 500 may be implemented, for example, as Indexed Array 286. IDs 512 and corresponding Zone centers 522 may be pre-calculated, at the Rx UE, and stored in entries 520 of indexed array 500, indexed according to GLL data, such as lat/lon pairs. As discussed with regard to FIG. 5, fields for Additional Data 524 of an entry 520 may be configured to store Zone IDs and corresponding Zone centers for Zones, peripherally disposed about the Rx UE, that are within NACK range of the current geographical location used for the 2-D lookup into the indexed array 500. Basing the lookup into the 2-D indexed array 500 using the current geographical location of the Rx UE, the results of the 2-D lookup may then include the selected Zone ID 512 for the Rx UE, and one or more Zone IDs of Zones within NACK range with corresponding NACK ranges. A NACK operation may then be performed 630.

In implementations, operations 600 may include monitoring, at the Rx UE, for transmissions from a transmitting UE (Tx UE), and subsequently receiving a location indication of a Tx UE via the transmissions. In an example, a GLL for the Tx UE may be determined at the Tx UE and transmitted to the Rx UE. Alternatively, or additionally, the Tx UE may determine and transmit its current Zone ID to the Rx UE. Upon determination of the selected Zone ID 512 (i.e., Zone center for the Rx UE) resulting from the selection 620 based on the 2-D lookup into the indexed array 500, using the current geographical location of the Rx UE, the received location indication of the Tx UE may be efficiently compared with the one or more Zone IDs associated with the selected Zone ID for the Rx UE. If a match occurs between the received GLL and/or Zone ID of the Tx UE and one of the one or more Zone IDs, then a NACK operation may be performed with the Tx UE. If such a match does not occur, then the Rx UE may return to monitoring for transmissions from a Tx UE.

In another example, Zone IDs and corresponding Zone centers may be stored in fields for Additional Data 524 corresponding to the selected Zone ID 512, but NACK range data may not. Upon determination of the selected Zone ID 512 resulting from the 2-D lookup into the indexed array 500, a calculation may then be performed to determine a distance between the Zone center 522 corresponding with the selected Zone ID 512 and the Zone center corresponding with the received location indication of the Tx UE. If the calculated distance is within the NACK range threshold, then a NACK operation may be performed with the Tx UE. If the distance is greater than the NACK range threshold, then the Rx UE may return to monitoring for transmissions from a Tx UE.

Thus, this first approach provides that floating point computations and vehicular Zone tracking may be advantageously reduced, and a current lat/lon for the Rx UE may be used instead as indices for a 2-D array table lookup for relevant data.

A second approach is similar in various respects to the first approach, described above. A primary distinction is based on the UE retrieving a geographically relevant pre-calculated indexed array from a remote source, as an alternative to pre-calculating an indexed array locally at the UE. Aspects include downloading an indexed array via a network, such as from a network entity 356. Other examples include downloading by way of a 5G NR SIB, or from a GNSS source. It will be appreciated that other sources and methods for obtaining a remotely managed indexed array for Zone data may be equally efficacious, and still lie within the scope of this disclosure. In this way, a UE may download an updated indexed array on demand, as it moves into and through various geographic Zones.

Under the second approach, the retrieved indexed array may include entries 520 comprising Zone data associated with a pre-determined Zone cluster. Such a Zone cluster may thus define a limited number of entries 520 in the indexed array, and thus provide economy and efficiency in the use of storage resources at the Rx UE. Conversely, storage resources dedicated at the Rx UE may be constrained, resulting in a specification at the Rx UE for the remote source to limit the amount of data retrieved at the Rx UE and stored in the indexed array. Thus, a retrieved indexed array may then contain a subset of the data that might otherwise be retrieved by an Rx UE with greater storage capacity. The Rx UE may request updates, or more frequent updates, to the indexed array to accommodate a smaller size of the indexed array and some rate of movement, for example, of a vehicle bearing the Rx UE. That is, a faster moving vehicle will presumably traverse geographic Zones more quickly and therefore perform (more frequent) updating.

According to aspects, a Zone cluster may include a set of geographical Zones along a particular route that a vehicle bearing an Rx UE may be planned to traverse. Accordingly, the Rx UE may retrieve an indexed array for those GLLs along a route from start to destination. If the route or destination changes, a new retrieval query may be applied to obtain further data. In this way, remote pre-calculation and sourcing provide efficient and timely access to indexed arrays for obtaining Zone ID, Zone center, and related data for determining a NACK response.

As mentioned, there are various possible remote sources for geographically relevant pre-calculated indexed arrays. Geographic Information Servers (GIS), such as popular network-based mapping and navigation services, as an example, may be enhanced to store, maintain, and provide pre-calculated indexed arrays as described. Pre-calculated indexed arrays, including distance NACK information, that are maintained at a GIS source may be subject to timely updates, which may be useful for certain non-vehicle uses, such for construction equipment and temporary road safety markers. For example, changes made to existing road paths for construction or emergencies may heighten the need for reliable NACK distance data. Other non-vehicle uses may also include, but are not limited to, providing distance NACK pre-calculated indexed arrays to certain vulnerable road users, such as pedestrians and cyclists.

According to a third approach, an indexed array may be managed dynamically. Such dynamically managed indexed array will be referred to herein as a dynamic indexed array. A dynamic indexed array as contemplated herein includes an indexed array that may be enhanced with additional data during operation; aspects provide that it may persist in storage, such as Memory 28 and Indexed Array 286. In this way, the data stored in the dynamic indexed array are allowed to develop over time in concurrence with use of the system. Aspects further provide that the dynamic indexed array may persist in storage until the occurrence of some purging event (e.g., by user direction, system reset/reconfiguration, etc.)

In an example implementation, a vehicle bearing a UE, e.g., an Rx UE, may navigate a route that is commonly used by a vehicle. The UE may maintain a dynamic indexed array populated with geographic Zone data relevant to the route. As discussed above, Zone data will be understood to include Zone data at least such as a Zone ID 512, Zone center 522, and Addition Data 524. According to some aspects, the UE may build up a collection, or "cache," of recently calculated Zone data corresponding with geographic Zones along the route with which to populate the dynamic indexed array. Thus, Zone data stored in entries 520, including for each entry 520 a Zone ID, Zone center, and Additional Data comprising Zone data for geographic Zones within NACK range, may be easily referenced while the vehicle bearing the UE is traversing that route, as well as geographic area.

Figure 7:
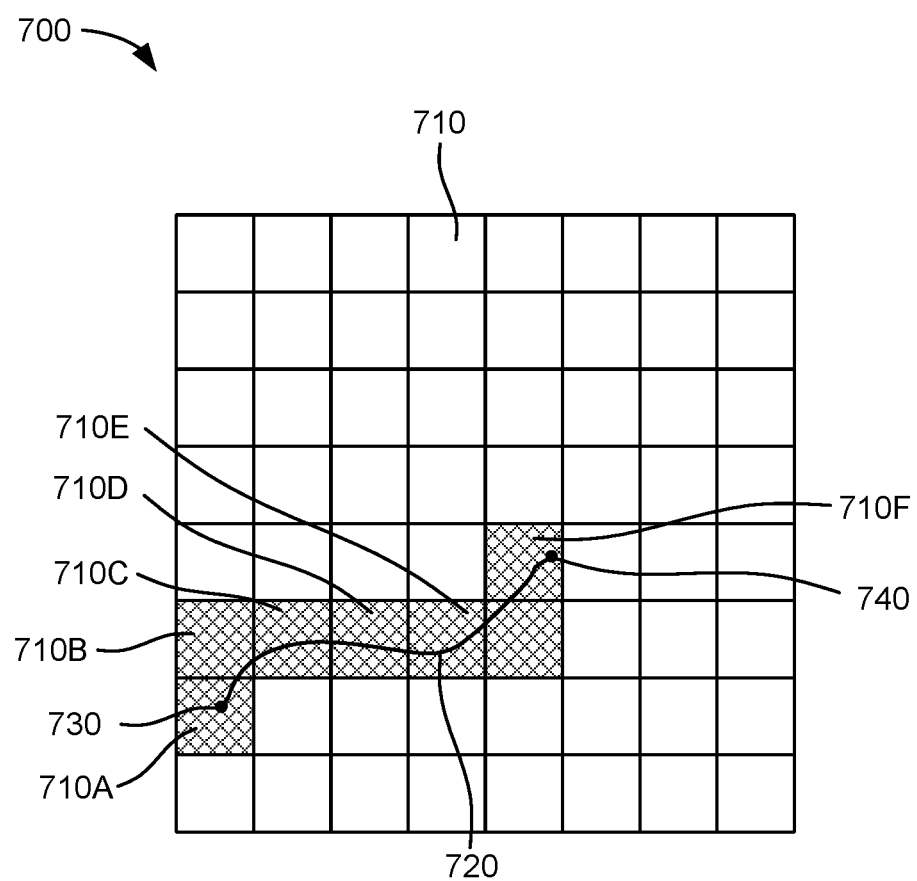
FIG. 7 depicts a conceptualization of an example grid of geographic Zones, with a route traversing multiple Zones to destination point.

FIG. 7 depicts an example conceptualized grid of geographic Zones, with a route traversing multiple Zones to destination point. In particular, FIG. 7 depicts a grid 700 of geographic Zones, such as a typical Zone 710. Route 720 begins at starting point 730 and traverses Zones 710A-F to destination point 740. It will be appreciated that the scale of grid 700 as shown may not accord with an actual distribution of geographic Zones as described herein, but is depicted in this way for purposes of explanation.

According to aspects, when the route 720 is preprogrammed and initially traversed, the Zone data for the geographic Zones 710A-F may be pre-calculated and stored in the dynamic indexed array. For example, a Zone Manager 241 disposed with Controller/Processor 280 may perform the Zone data pre-calculations, with the resulting Zone data stored in Indexed Array 286.

According with aspects, the route 720 may be traversed ad hoc. When the vehicle bearing the UE, e.g., Rx UE, begins a trip at starting point 730 in Zone 710A, the UE may initially calculate, at Zone Manager 241, Zone data for Zone 730, along with Additional Data 524 including Zone data for peripherally disposed Zones within NACK range. For example, the Zones within NACK range of Zone 710A may include all adjacent Zones (one-removed), as well as Zones two-removed from Zone 710A, depending on what the NACK range is and the sizes of the Zones 710. When the vehicle enters a different geographic Zone along the route 720, for example, when entering Zone 710B upon leaving Zone 710A, the UE may calculate Zone data for Zone 710B. The calculation of Zone data for Zone 710B may, of course, utilize any relevant Zone data that was initially calculated for Zone 710A. When the vehicle enters Zone 710C upon leaving Zone 710B, the UE may calculate Zone data for Zone 710C, likewise utilizing any relevant Zone data that was calculated for Zone 710B. This process may iterate from Zone to Zone along route 720 until the vehicle reaches the destination point 740, in Zone 710F. At that point, Zone data for each Zone 710A-F traversed on the route 720 may have been calculated and stored in entries 520 of the dynamic indexed array, indexed according to a lat/lon associated with the Zone data. The Zone data calculations have been described as being performed locally, at the UE. In an implementation, Zone data for a Zone 710A-F along route 720 may be obtained from a remote source, similar to remote sourcing described above.

Given that the dynamic indexed array may persist in storage (e.g., Indexed Array 286 in Memory 282), the dynamic indexed array may then be available for reference at any subsequent time the vehicle bearing the UE traverses the route 720, or is otherwise traversing the Zones 710A-710F, including the reverse of route 720. Further, as different routes are traveled in a given area, Zone data for additional geographic Zones 710 may be calculated and stored into the dynamic indexed array, thus resulting in the accumulation in the dynamic indexed array of Zone data relevant to navigation routes commonly used by a vehicle bearing the Rx UE. Aspects also provide for updates to the dynamic indexed array if a navigation route happens to change while en route. The dynamic indexed array may be updated appropriately with locally generated, or remotely supplied, Zone data.

Figure 8:
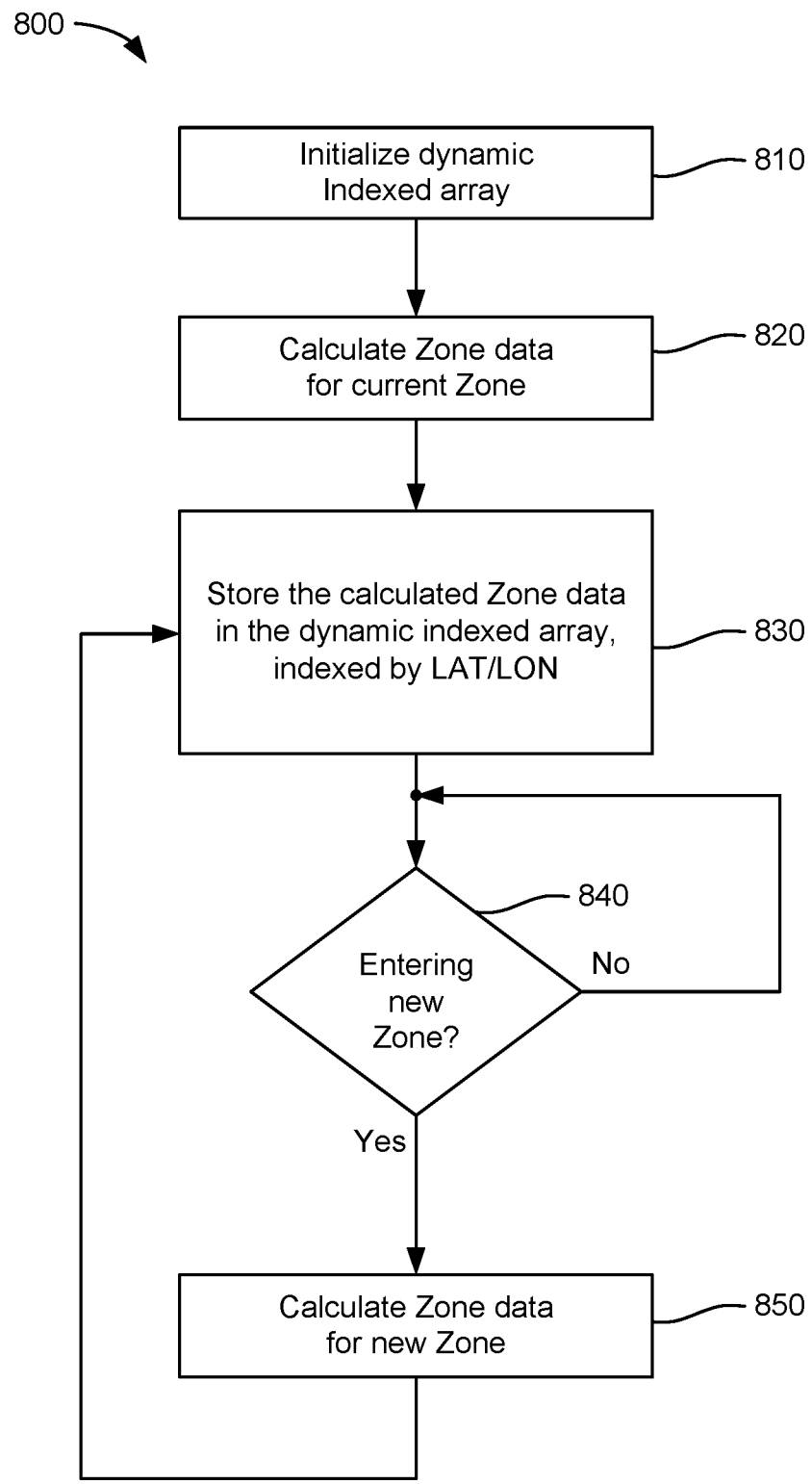
FIG. 8 is a flowchart describing an example operation for managing a dynamic indexed array, in accordance with aspects of present disclosure.

FIG. 8 is a flowchart describing example operations 800 for managing a dynamic indexed array, such as described. Operations 800 may be implemented as software components that are executed and run on one or more processors, memories and data structures, and position/location modules (e.g., Controller/Processor 280, Memory 282, Indexed Array 286, and GNSS Module 284, of FIG. 2). In particular, operations 800 may be performed all, or in part, at a Zone Manager 241, an element of Controller/Processor 280. Further, any transmissions and/or receptions of signals by the UE under operations 800 may be enabled, for example, by one or more antennas (e.g., antennas 252, of FIG. 2). In some aspects, the transmission and/or reception of signals by the UE may be implemented via a bus interface of one or more processors (e.g., Controller/Processor 280) obtaining and/or outputting signals.

A dynamic indexed array may be initialized 810, for example, at the beginning of a route to be traversed ad hoc by a vehicle bearing a UE, (e.g., an Rx UE). That is, a pre-planned route is not engaged, but rather the route taken will be developed ad hoc along the way. The vehicle may be at a starting point 730 of FIG. 7, for example, when the initialization 810 operation is performed. The starting point 730 is therefore in the "current Zone," corresponding with Zone 710A, and the Zone data for current Zone 710A are then calculated 820. The calculation 820 includes retrieval of a current lat/lon, such as from GNSS Module 284, and the Zone data based on the lat/lon include, accordingly, a corresponding Zone ID 512, Zone center 522, and Additional Data 524, relevant to Zone 710A. According to aspects, the UE may retrieve the relevant current Zone data from a remote source, such as a network entity 356 as described in the second approach above. The Zone data thus calculated are stored 830 in the dynamic indexed array, such as Indexed Array 286, according to two indices, lat and lon. The operations next include a test 840 whether the vehicle is entering a new Zone. As the vehicle travels, it may exit Zone 710A, for instance, and enter Zone 710B. On this possibility, Zone 710B is regarded as a "new" Zone, and the operation proceeds according to the YES condition to calculate 850 Zone data for the new Zone. The calculation 850 includes retrieval of a current lat/lon, such as from GNSS Module 284. Some, or all, of the Zone data for Zone 710B may have already been calculated, or retrieved, during calculation 820, and may be utilized in calculation 850. The Zone data for Zone 710B based on that lat/lon are stored 830 in the dynamic indexed array The test 840 is then performed again. As the vehicle travels, it may not cross into a new Zone at the time of iteration of test 840, under which NO condition the operations iterate again to test 840. As the vehicle traverses the various remaining Zones 710B-F, the operation 800 therefore provides that for each traversed Zone, Zone data are calculated 850 as described, using any previously calculated Zone data as appropriate, and stored 830 in the dynamic indexed array. Though not explicitly shown, it will be understood that at the end of travel, e.g., at destination point 740, the operations will iterate at test 840 until terminated by some usual means (e.g., shutting down a controlling app, turning off power, etc.). Advantageously, the Zone data accumulated are those Zone data that have been needed by the UE at some time, resulting in economical use of storage resources, i.e., Memory 282, including Indexed Array 286. Further, as Zone data are accumulated over time, aspects provide that stored Zone data corresponding with geographic Zones least traveled, may be purged to avail storage for newly calculated Zone data. For example, a time/date indication field may be included in Additional Data 524 for each entry 520 in the dynamic indexed array, and an entry 520 with an oldest time/date indication may be purged first, among all of the entries 520, to clear space for new Zone data. Such a time/date indication may also be updated each time an entry 520 is accessed, thus allowing for retention of the most-used Zone data.

Once the dynamic indexed array is populated with Zone data as described, any travel within the geographic Zones corresponding with the stored Zone data may trigger a simple 2-D lookup into the dynamic indexed array for Zone data relevant to the current Zone, whichever one that may be. Thus, while in any previously traversed Zone, whether following a previous route or not, a UE (e.g., Rx UE) may quickly access relevant Zone data, including distance NACK ranges, with a 2-D lookup based on a current lat/lon pair.

According to a fourth approach, a global crowdsourced dynamic indexed array may be defined, such that UEs situated at various GLL may append calculated Zone data into a global database. The global database may then be made available to other UEs in similar locations and route. Such a global database may be maintained and provided by various means, including, but not limited to, data, mapping, and/or navigation services, GNSS systems, as well as services specifically dedicated to providing distance NACK data (e.g., Zone data). Indeed, any or all of such services may work in concert to provide global access to Zone data. It will be appreciated that such a globally accessible global DB may be implemented in a globally-distributed system of networked elements, such as servers and the like. Uploading Zone data from the various UEs to the global DB may be accomplished via communications between UEs and the global DB, or to any distributed elements of the global DB. Distribution of Zone data from the global DB may be via any of a variety of means, including network entities 356, and through feeds provided by various data, mapping, and/or navigation services.

Aspects provide for local adaptation of various Additional Data 524 fields of the Zone data, in entries 520 of dynamic indexed arrays. Given the wide variation of vehicles, conditions, and events extant on a global scale, UEs disposed with different vehicles may use, or derive, different NACK ranges when calculating Zone data. Any, or all, such fields may then be available to any other UE by retrieval from the global DB followed by a simple 2-D lookup based on geographical location (e.g., lat/lon), as described above.

According to various aspects, locally adapted fields of the Additional Data 524 may include various vehicle-specific data. Vast differences in the population of vehicle types over the globe may be described according to various vehicle characteristics. Each vehicle may have some knowledge of its characteristics in a manner allowing for Zone data relevant to that vehicle may be downloaded from a global database, or, more generally, from any remote source, as discussed above. In this way, a UE may retrieve Zone data, including NACK range data, tailored appropriately to the requirements of its bearing vehicle, or regarding a specific target vehicle or vehicle type.

Figure 9A:
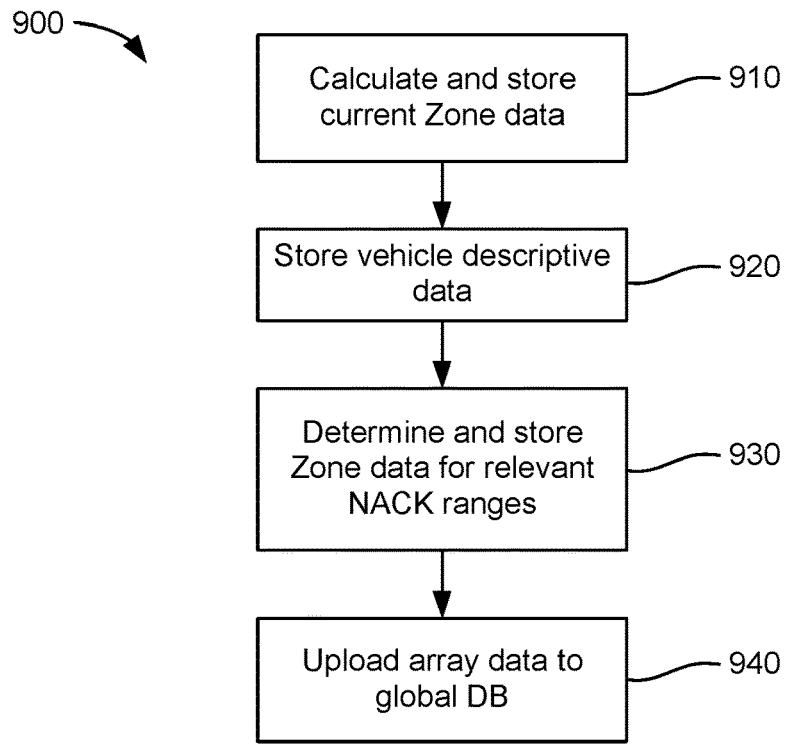
FIGS. 9A and 9B are flow diagrams depicting example operations for uploading and downloading Zone data to a global database, in accordance with aspects of the present disclosure.
Figure 9B:
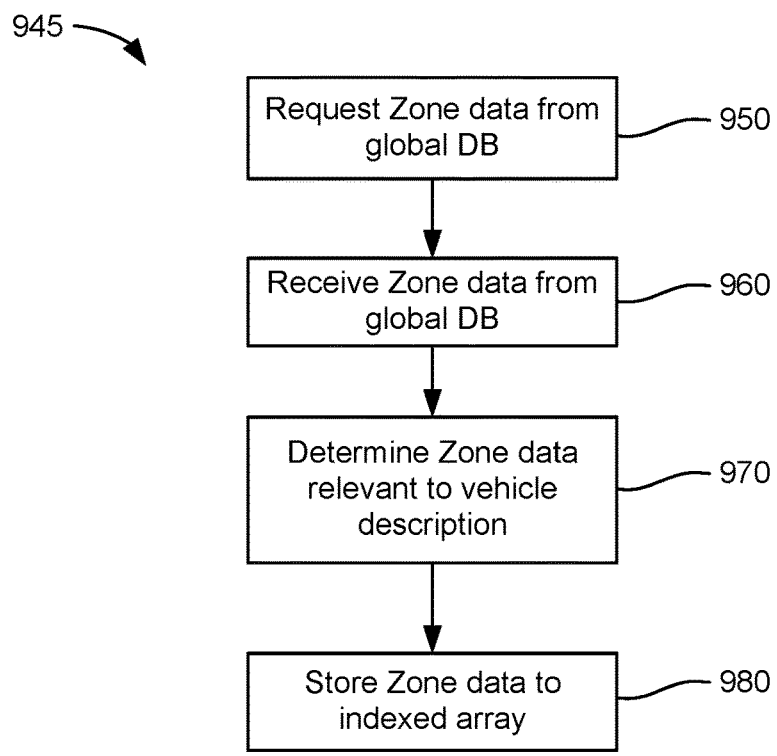

FIGS. 9A and 9B are basic flow diagrams depicting example operations for uploading and downloading Zone data to a global DB, as discussed above. Operations 900 and 945 may be implemented as software components that are executed and run on one or more processors, memories and data structures, and position/location modules (e.g., Controller/Processor 280, Memory 282, Indexed Array 286, and GNSS Module 284, of FIG. 2). In particular, operations 600 may be performed all, or in part, at a Zone Manager 241, an element of Controller/Processor 280. Further, any transmissions and/or receptions of signals by the UE under operations 900 and 945 may be enabled, for example, by one or more antennas (e.g., antennas 252, of FIG. 2). In some aspects, the transmission and/or reception of signals by the UE may be implemented via a bus interface of one or more processors (e.g., Controller/Processor 280) obtaining and/or outputting signals.

Referring to FIG. 9A, current Zone data for a UE disposed within a vehicle may be calculated and stored 910 at the UE into an indexed array. Aspects provide that the indexed array may be a dynamic indexed array. It is contemplated also that a static indexed array may be used as well, since implementation of a dynamic vs. static indexed array may be a design consideration at the UE based on storage constraints, or lack thereof, and not relevant to operations 900, and operations 945 described below. As discussed above, the current Zone data may include a current Zone ID 512, and current Zone center 522. Vehicle descriptive data may be stored 920 in the indexed array into fields of Additional Data 524. Zone data relating to nearby by Zones within NACK range are determined 930. Aspects provide that the Zone data so determined may be relevant to the vehicle type characterized by the vehicle descriptive data. That is, NACK ranges may vary according to vehicle type/description, and appropriate determinations of Zones within the various NACK ranges may therefore be made. Further, external conditions at the current site of the UE may affect the determinations of NACK ranges. For example, where a construction vehicle bearing the UE is traveling on a temporary work road in an area of road construction, NACK ranges to other UEs situated on existing roadways may be affected. Such data may further be useful to other vehicles in nearby areas. The Zone data stored in the indexed array may then be uploaded 940 to a global DB configured to maintain crowdsourced Zone data for access later by the same UE, and by UEs disposed with other vehicles.

Referring to FIG. 9B, crowdsourced Zone data may be requested 950 by a UE in a vehicle, at the UE, from the global DB. The request may be sent via a network and network entities 356 to the global DB, or, for example, any local element of the global DB. According to aspects, the request includes a current GLL of the UE, which may be expressed as a lat/lon pair, a current Zone ID, or both. The request may include also vehicle descriptive data, as described with regard to FIG. 9A. Crowdsourced Zone data from the global DB may be received 960 at the UE. Aspects provide for the Zone data to correspond with Zones that are peripherally disposed about the GLL of the UE, and include for each Zone any vehicle descriptive data provided via crowdsourcing. According to aspects, the Zone data may be pre-selected at the global DB according to the vehicle descriptive data (e.g., vehicle type) provided when requested 950. In an implementation, the received Zone data may include Zone data based on a generic interpretation of NACK range. That is, vehicle descriptive data may not have been included when requested 950, or was included but not regarded at the global DB, so Zone data for a generic vehicle/UE are received. A determination 970 is made at the UE for Zone data that are relevant to the vehicle description. For Zone data pre-selected at the global DB according to vehicle descriptive data, the received Zone data may be simply stored 980 to an indexed array. Again, the indexed array may be a dynamic indexed array, or a static indexed array, as discussed. It is contemplated that received Zone data applying to a generic vehicle/UE may also include vehicle descriptive data related to the corresponding Zones. In this case, determining 970 Zone data relevant to the vehicle description includes, for example, a search or sort through the various vehicle description data included in the received Zone data for matches or similarities in vehicle descriptions. Those Zone data having a match or similarity with the vehicle description of the current vehicle/UE may then be stored 980 into the indexed array.

Figure 10:
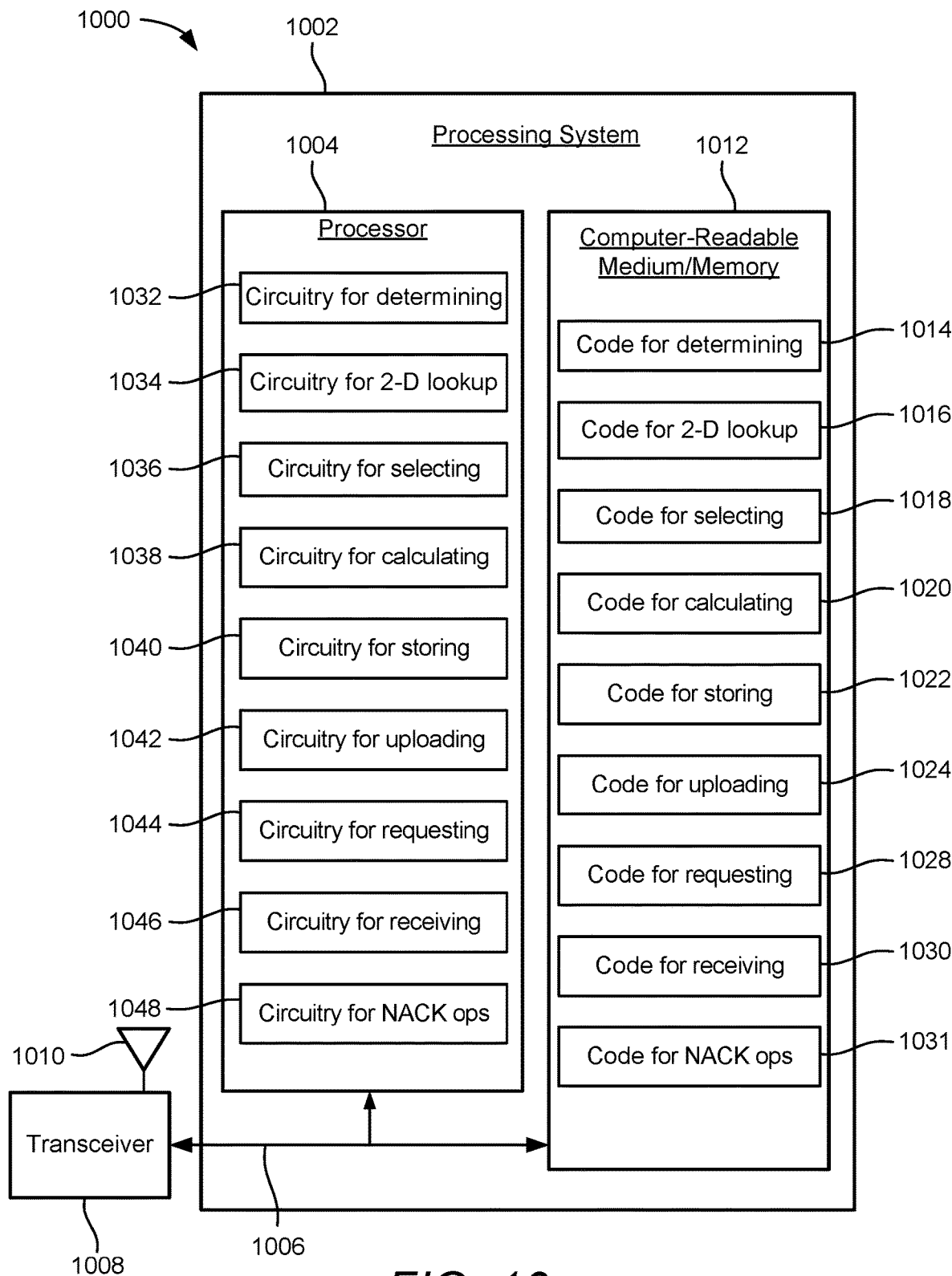
FIG. 10 illustrates an example communications device 1000 that may include various components configured to perform operations for the techniques disclosed herein, in accordance with aspects of the present disclosure.

FIG. 10 illustrates an example communications device 1000 that may include various components (e.g., corresponding to means-plus-function components) configured to perform operations for the techniques disclosed herein, such as the operations illustrated in FIGS. 6, 8, 9A, and 9B. The communications device 1000 may include a processing system 1002 coupled to a transceiver 1008. The transceiver 1008 may be configured to transmit and receive signals for the communications device 1000 via an antenna 1010, including any signals described herein. The processing system 1002 may be configured to perform processing functions for the communications device 1000, including processing signals received, signals to be transmitted, or both, at the communications device 1000.

The processing system 1002 includes a processor 1004, coupled to a computer-readable medium/memory 1012 via a bus 1006. According to certain aspects, the computer-readable medium/memory 1012 may correspond with Memory 282, and may be configured to store instructions (e.g., computer-executable code) that, when executed by the processor 1004 may cause the processor 1004 to perform operations illustrated in FIGS. 6, 8, 9A, and 9B, for example, or other operations, for performing the various techniques discussed herein related to distance-based HARQ signaling, and Zone management (i.e., Zone data management). In particular, the code for operations disclosed with regard to computer-readable medium/memory 1012 may be executed all, or in part, at a Zone Manager 241, and/or an element of Controller/Processor 280. In certain aspects, computer-readable medium/memory 1012 stores code 1014 for determining, such as determining a current GLL, whether to perform a NACK operation, determining Zone data for relevant NACK ranges, and determining Zone data relevant to a vehicle description; code 1016 for performing a 2-D lookup; code 1018 for selecting, such as selecting Zone IDs and corresponding Zone centers; code 1020 for calculating, such as calculating Zone data; code 1022 for storing, such as storing Zone data into static and dynamic indexed arrays; code 1024 for uploading via transceiver 1008, such as uploading Zone data in an indexed array; code 1028 for requesting via transceiver 1008, such as requesting Zone data; code 1030 for receiving via transceiver 1008, such as receiving Zone data; and code 1031 for performing NACK operations.

According to certain aspects, the Processor 1004 may correspond with Controller/Processor 280, and may be include circuitry to perform operations illustrated in FIGS. 6, 8, 9A, and 9B, for example, or other operations, for performing the various techniques discussed herein related to distance-based HARQ signaling, and Zone management (i.e., Zone data management). In particular, the circuitry for operations disclosed with regard to Processor 1004 may be controlled all, or in part, at a Zone Manager 241, and/or an element of Controller/Processor 280. In certain aspects, Processor 1004 includes circuitry 1032 for, but not limited to, determining, such as determining a current GLL, whether to perform a NACK operation, determining Zone data for relevant NACK ranges, and determining Zone data relevant to a vehicle description; circuitry 1034 for performing a 2-D lookup; circuitry 1036 for selecting, such as selecting Zone IDs and corresponding Zone centers; circuitry 1038 for calculating, such as calculating Zone data; circuitry 1040 for storing, such as storing Zone data into static and dynamic indexed arrays; circuitry 1042 for uploading via transceiver 1008, such as uploading Zone data in an indexed array; circuitry 1044 for requesting via transceiver 1008, such as requesting Zone data; circuitry 1046 for receiving via transceiver 1008, such as receiving Zone data; and circuitry 1048 for performing NACK operations.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into sub-bands. For example, a sub-band may cover 1.08 MHz (e.g., 6 RBs), and there may be 1, 2, 4, 8, or 16 sub-bands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Other entities besides BSs may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein include one or more steps or actions for achieving the methods. The method operations and/or actions may be interchanged with one another without departing from the scope of the claims. In other words, unless a specific order of steps or actions is specified, the order and/or use of specific operations and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, with reference to an element in the singular not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may include a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may include a single instruction, or multiple instructions, and may be distributed over several different code segments, among different programs, and across multiple storage media. The computer-readable media may include a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may include non-transitory computer-readable media (e.g., tangible media). In addition, for other aspects computer-readable media may include transitory computer-readable media (e.g., a signal). Combinations of the above are to be included within the scope of computer-readable media.

Thus, certain aspects may include a computer program product for performing the operations presented herein. For example, such a computer program product may include a computer-readable medium having instructions stored (and/or encoded) thereon, the instructions being executable by one or more processors to perform the operations described herein, for example, instructions for performing the operations described herein.

Further, it will be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication, comprising:
   determining, at a receiving user equipment (UE), a current Geographic Latitude and Longitude (GLL) of the receiving UE;
   selecting, at the receiving UE, a current entry of Zone data from an indexed array based on a two-dimensional (2-D) lookup into the indexed array using the current GLL, the indexed array configured to store one or more entries of Zone data for one or more geographic Zones, each entry of Zone data for a corresponding geographic Zone in the indexed array including a Zone identifier (ID) of the corresponding geographic Zone, a Zone center of the corresponding geographic Zone, and one or more other Zone IDs indicating one or more other geographic Zones associated with the one or more other Zone IDs being within one or more respective negative-acknowledgement (NACK) ranges to the corresponding geographic Zone; and
   performing a NACK operation with a transmitting UE based on a Zone ID of the transmitting UE matching one of the one or more other Zone IDs in the selected current entry of Zone data.

2. The method of claim 1, further comprising receiving, at the receiving UE, a location indication of the transmitting UE.

3. The method of claim 1, wherein the indexed array is stored in a persistent storage at the receiving UE.

4. The method of claim 1, further comprising retrieving, at the receiving UE, the indexed array from a remote source.

5. The method of claim 4, wherein the indexed array comprises a Zone cluster, wherein a size of the Zone cluster is controlled in accordance with storage resources at the receiving UE.

6. The method of claim 1, wherein the indexed array is configured with Zone data associated with recurring routes traversed by a vehicle bearing the receiving UE.

7. The method of claim 1, wherein the indexed array includes a static indexed array.

8. The method of claim 1, wherein the indexed array includes a dynamic indexed array.

9. The method of claim 8, wherein the dynamic indexed array includes a global crowdsourced dynamic indexed array comprising Zone data provided by other UEs.

10. The method of claim 8, wherein the dynamic indexed array includes locally adapted fields added to the Zone data.

11. An apparatus, comprising:
    a memory;
    at least one processor communicatively coupled to the memory and at least one transceiver, the at least one processor configured to:
       determine a current Geographic Latitude and Longitude (GLL);
       select a current entry of Zone data from an indexed array based on a two-dimensional (2-D) lookup into the indexed array using the current GLL, the indexed array stored in the memory and configured to store one or more entries of Zone data for one or more geographic Zones, each entry of Zone data for a corresponding geographic Zone in the indexed array including a Zone identifier (ID) of the corresponding geographic Zone, a Zone center of the corresponding geographic Zone, and one or more other Zone IDs indicating one or more other geographic Zones associated with the one or more other Zone IDs being within one or more respective negative-acknowledgement (NACK) ranges to the corresponding geographic Zone; and
       perform a NACK operation with a transmitting UE based on a Zone ID of the transmitting UE matching one of the one or more other Zone IDs in the selected current entry of Zone data; and
    the at least one transceiver configured to:
       receive a location indication of the transmitting UE; and
       perform the NACK operation with the transmitting UE.

12. The apparatus of claim 11, wherein the memory includes a persistent storage in which the indexed array is stored.

13. The apparatus of claim 11, wherein the at least one transceiver is further configured to retrieve the indexed array from a remote source.

14. The apparatus of claim 13, wherein the indexed array comprises a Zone cluster, wherein a size of the Zone cluster is controlled in accordance with storage resources.

15. The apparatus of claim 11, wherein the indexed array is populated with Zone data associated with recurring routes traversed by a vehicle bearing the apparatus.

16. The apparatus of claim 11, wherein the indexed array includes a static indexed array.

17. The apparatus of claim 11, wherein the indexed array includes a dynamic indexed array.

18. The apparatus of claim 17, wherein the dynamic indexed array includes a global crowd-sourced dynamic indexed array comprising Zone data provided by other UEs.

19. The apparatus of claim 17, wherein the dynamic indexed array includes locally adapted fields added to the Zone data.

20. An apparatus, comprising:
    means for determining, at a receiving user equipment (UE), a current Geographic Latitude and Longitude (GLL) of the receiving UE;
    means for selecting a current entry of Zone data from an indexed array based on a two-dimensional (2-D) lookup into the indexed array using the current GLL, the indexed array configured to store one or more entries of Zone data for one or more geographic Zones, each entry of Zone data for a corresponding geographic Zone including a Zone identifier (ID) of the corresponding geographic Zone, a Zone center of the corresponding geographic Zone, and one or more other Zone IDs indicating one or more other geographic Zones associated with the one or more other Zone IDs being within one or more respective negative-acknowledgement (NACK) ranges to the corresponding geographic Zone; and means for performing a NACK operation with a transmitting UE based on a Zone ID of the transmitting UE matching one of the one or more other Zone IDs in the selected current entry of Zone data.

21. The apparatus of claim 20, further comprising means for receiving, at the receiving UE, a location indication of the transmitting UE.

22. The apparatus of claim 20, wherein the indexed array is stored in a persistent storage at the receiving UE.

23. The apparatus of claim 20, further comprising means for retrieving, at the receiving UE, the indexed array from a remote source.

24. The apparatus of claim 23, wherein the indexed array comprises a Zone cluster, wherein a size of the Zone cluster is controlled in accordance with storage resources at the receiving UE.

25. The apparatus of claim 20, wherein the indexed array is configured with Zone data associated with recurring routes traversed by a vehicle bearing the receiving UE.

26. The apparatus of claim 20, wherein the indexed array includes a dynamic indexed array, including a global crowdsourced dynamic indexed array comprising Zone data provided by other UEs.

27. A non-transitory computer readable storage medium comprising code, which when executed by a computer, causes the computer to perform operations for wireless communication, the non-transitory computer readable storage medium comprising:

code for determining, for a receiving user equipment (UE) in a vehicle, a current Geographic Latitude and Longitude (GLL) of the receiving UE;

code for selecting, at the receiving UE, a current entry of Zone data from an indexed array based on a two-dimensional (2-D) lookup into the indexed array using the current GLL, the indexed array configured to store one or more entries of Zone data for one or more geographic Zones, each entry of Zone data for a corresponding geographic Zone including a Zone ID of the corresponding geographic Zone, a Zone center of the corresponding geographic Zone, and one or more other Zone IDs indicating one or more other geographic Zones associated with the one or more other Zone IDs being within one or more respective negative-acknowledgement (NACK) ranges to the corresponding geographic Zone;

code for receiving, at the receiving UE, a location indication of a transmitting UE; and code for performing a NACK operation with the transmitting UE based on a Zone ID of the transmitting UE matching one of the one or more other Zone IDs in the selected current entry of Zone data.

28. The non-transitory computer readable storage medium of claim 27, further comprising code for retrieving, at the receiving UE, the indexed array from a remote source.

29. The non-transitory computer readable storage medium of claim 27, wherein the indexed array is configured with Zone data associated with recurring routes traversed by a vehicle bearing the receiving UE.

30. The non-transitory computer readable storage medium of claim 27, wherein the indexed array is a dynamic indexed array, including a global crowdsourced dynamic indexed array comprising Zone data provided by other UEs.

* * * * *